United States Patent [19]
Beal

[11] Patent Number: 6,101,178
[45] Date of Patent: Aug. 8, 2000

[54] PSEUDOLITE-AUGMENTED GPS FOR LOCATING WIRELESS TELEPHONES

[75] Inventor: Robert E. Beal, Vienna, Va.

[73] Assignee: KSI Inc., Annandale, Va.

[21] Appl. No.: 09/113,350

[22] Filed: Jul. 10, 1998

Related U.S. Application Data

[60] Provisional application No. 60/052,090, Jul. 10, 1997, and provisional application No. 60/078,833, Mar. 20, 1998.

[51] Int. Cl.[7] .............................. H04J 3/00; H04Q 7/20; H04B 7/185
[52] U.S. Cl. .......................... 370/336; 455/457; 342/357
[58] Field of Search .................................... 370/316, 314, 370/320, 321, 332, 335, 336, 337, 342, 347; 455/12.1, 13.2, 38.3, 457, 524, 561, 575; 375/200, 206, 335; 342/357, 457, 463, 464

[56] References Cited

U.S. PATENT DOCUMENTS

| | | | |
|---|---|---|---|
| 4,751,512 | 6/1988 | Longaker | 342/357 |
| 4,866,450 | 9/1989 | Chisholm | 342/410 |
| 5,177,489 | 1/1993 | Hatch | 342/357 |
| 5,276,911 | 1/1994 | Levine et al. | 455/53.1 |
| 5,297,162 | 3/1994 | Lee et al. | 375/1 |
| 5,301,188 | 4/1994 | Kotzin et al. | 370/50 |
| 5,311,194 | 5/1994 | Brown | 342/357 |
| 5,323,418 | 6/1994 | Ayerst et al. | 375/1 |
| 5,343,494 | 8/1994 | Ayerst et al. | 375/1 |
| 5,343,496 | 8/1994 | Honig et al. | 375/1 |
| 5,345,468 | 9/1994 | Bi | 375/1 |
| 5,353,300 | 10/1994 | Lee et al. | 375/1 |
| 5,353,302 | 10/1994 | Bi | 375/1 |
| 5,359,624 | 10/1994 | Lee et al. | 375/1 |
| 5,375,059 | 12/1994 | Kyrtsos et al. | 364/449 |
| 5,381,447 | 1/1995 | Ayerst et al. | 375/1 |
| 5,390,125 | 2/1995 | Sennott et al. | 364/449 |
| 5,438,517 | 8/1995 | Sennott et al. | 364/449 |
| 5,442,558 | 8/1995 | Kyrtsos et al. | 364/449 |
| 5,467,368 | 11/1995 | Takeuchi et al. | 375/206 |
| 5,481,561 | 1/1996 | Fang | 375/205 |
| 5,506,861 | 4/1996 | Bottomley | 375/200 |
| 5,548,293 | 8/1996 | Cohen | 342/357 |
| 5,572,218 | 11/1996 | Cohen et al. | 342/357 |
| 5,583,513 | 12/1996 | Cohen | 342/357 |
| 5,604,732 | 2/1997 | Kim et al. | 370/342 |
| 5,604,765 | 2/1997 | Bruno et al. | 375/200 |

(List continued on next page.)

OTHER PUBLICATIONS

A.J. VanDierendonck, "Concepts for Replacing Shipboard TACAN with Differential GPS," ION Satellite Division Third International Technical Meeting, Sep. 1990.

R. Lupas, et al., "Near–Far Resistance of Multiuser Detectors in Asynchronous Channels," IEEE Transactions on Communications, vol. 38, No. 4, Apr. 1990, pp. 496–508.

"RCTM Recommended Standards for Differential Navstar GPS Service Version 2.0," RTCM Special Committee, No. 104, Jan. 1990.

*Primary Examiner*—Chau Nguyen
*Assistant Examiner*—Chiho Andrew Lee
*Attorney, Agent, or Firm*—Sterne, Kessler, Goldstein & Fox P.L.L.C.

[57] ABSTRACT

Ground-based pseudolites support accurate determination of mobile receiver locations by broadcasting CDMA signals interleaved by a TDMA system. Pseudolites synchronize signal transmissions with an accurate timing reference, such as can be derived from GPS satellites. Adjacent pseudolites broadcast CDMA signals at different times, eliminating near-far signal interference between pseudolites. A mobile receiver, typically a cellular telephone, receives and enables determination of times of arrival (TOA) of the pseudolite signals. A location processor associated with the mobile receiver may access an internal database of pseudolite locations, or pseudolite location information may be encoded in pseudolite transmissions. The location processor uses pseudolite location information and TOA to determine mobile receiver location. The TDMA pseudolite-based system may augment the GPS to provide more accurate location information than is available from the GPS alone.

68 Claims, 3 Drawing Sheets

U.S. PATENT DOCUMENTS

| | | | |
|---|---|---|---|
| 5,629,855 | 5/1997 | Kyrtsos et al. | 364/460 |
| 5,646,630 | 7/1997 | Sheynblat et al. | 342/357.14 |
| 5,663,734 | 9/1997 | Krasner | 342/357 |
| 5,677,930 | 10/1997 | Bottomley | 375/208 |
| 5,686,924 | 11/1997 | Trimble et al. | 342/357 |
| 5,701,587 | 12/1997 | Kim | 455/43.1 |
| 5,708,440 | 1/1998 | Trimble et al. | 342/357 |
| 5,717,404 | 2/1998 | Malla | 342/357 |
| 5,757,314 | 5/1998 | Gounon | 342/357 |
| 5,786,773 | 7/1998 | Murphy | 340/947 |
| 5,913,170 | 6/1999 | Wortham | 455/457 |
| 5,945,944 | 8/1999 | Krasner | 342/357.06 |
| 5,995,043 | 11/1999 | Murphy | 342/357.03 |

PSEUDOLITE-AUGMENTED GPS FOR LOCATING WIRELESS TELEPHONES

RELATED APPLICATIONS

This application claims the benefit of the filing dates of Provisional Application Ser. No. 60/052,090, filed Jul. 10, 1997 and Provisional Application Ser. No. 60/078,833 filed Mar. 20, 1998.

BACKGROUND AND SUMMARY OF THE INVENTION

The Global Positioning system (GPS) is a time-synchronized space-based satellite system that broadcasts spread spectrum codes from a nominal constellation of 24 earth-orbiting satellites. GPS uses Code Division Multiple Access (CDMA) to simultaneously broadcast multiple codes on each GPS frequency. Since the standard GPS constellation consists of 24 satellites, 24 codes are normally broadcast simultaneously on each GPS frequency.

Because each satellite broadcasts a unique code, and because the codes have poor cross-correlation properties, it is relatively easy to use matched replica correlation processing to extract any particular code from the rest. In matched replica processing, a replica of a code sequence is compared with the received signal. The replica will correlate with the received signal only if the received signal contains the sequence of codes that match the replica and only when the replica is correctly aligned with the code sequence.

The GPS satellite constellation is continuously monitored, with ephemeris and clock corrections broadcast so that receiving equipment can locate GPS satellites at any time and make corrections necessary to account for errors in each satellite's clock. The distance from the satellite to the receiver can be determined from the location of a satellite, the time that the satellite's coded message was transmitted, and the nominal time the message was received. If codes are received from four or more GPS satellites, then the receiver's position and the error in the receiver's clock can be estimated. It is necessary to ensure that the receiver's clock is synchronized with the satellite constellation's clock in order to accurately measure the elapsed time between a satellite's code sequence transmission and reception of that code sequence by a GPS receiver.

GPS can provide highly accurate position estimates. However, the GPS signal frequency is approximately 1.5 GHz and its power level at the receiving antenna is −160 dBW. The high frequency and low received power of the GPS signals restrict the use of GPS to locations where the receiver's antenna has a clear, line-of-sight view of the requisite number of satellites. The requisite number of satellites is normally four, but can be less if some form of aiding is used. For example, if altitude aiding is used, it may be possible to obtain a GPS solution with three satellites. This line-of-sight restriction degrades GPS performance in buildings, in vehicles, under foliage, in areas with steep terrain where the horizon is blocked by mountains or high buildings, or other places where the GPS antenna does not have an unobstructed view of the sky.

Pseudolites

One way to mitigate these problems is to add pseudolites on the ground to augment the space-based GPS satellite constellation. Pseudolites, or pseudo-satellites, function like GPS satellites but are located on the Earth's surface rather than in orbit about the Earth. In the context of this invention, the term "pseudolite" means any transmitter that broadcasts coded spread spectrum signals (e.g., pseudo-random code sequences) that can be used to determine the distance between the transmitter and the receiver, i.e., ranging signals. A pseudolite can broadcast on one or more of the GPS satellite frequencies, or it can broadcast on a separate frequency. If a pseudolite broadcasts on a GPS frequency, it can mask the GPS broadcasts, particularly when the receiver is in close proximity to the pseudolite. Broadcasting on a separate frequency adds cost to the receiver because the receiver must have the frequency bandwidth to receive and process both the GPS and pseudolite signals.

Like GPS satellites, pseudolites broadcast repeating pseudo-random code sequences that a receiver on the ground can process to determine the elapsed time between code transmission and code reception. A pseudolite receiver can determine the distance between a pseudolite and the receiver from (1) the location of a pseudolite, (2) when the pseudolite transmits its code sequence, (3) nominally when the pseudolite receiver receives the code sequence, and (4) the speed of light. The pseudolite receiver processes the pseudolite transmissions in exactly the same way a GPS receiver processes the GPS satellite transmissions. A dual GPS/pseudolite receiver can concurrently process and apply range measurements from satellites and/or pseudolites to determine the receiver's location. That is, the receiver can use GPS measurements, pseudolite measurements, or a combination of GPS and pseudolite measurements to determine its own location.

A ground-based pseudolite has two major advantages over a space-based satellite. First, the ground-based pseudolite does not move, and its position can therefore be determined to any achievable measurement accuracy. Achievable accuracy is a function of the amount of time one spends making the measurement: using dual frequency GPS carrier tracking, centimeter accuracy can be achieved. Second, the pseudolite's output power can be arbitrarily large, allowing the signal to be received in areas where GPS is often blocked.

The Near-Far Problem and Time Division Multiplexing

When multiple pseudolites broadcast on a common frequency, they suffer from what is known as the "near-far problem." A pseudolite that is too near a receiver can block reception of signals from distant pseudolites. This occurs when the received power level from the near-field pseudolite is much higher than the received power level from the far-field pseudolite, thereby masking the weaker signal. When pseudolites broadcast at the same frequency as the space-based GPS constellation, they can, when near enough to the receiver, mask the satellite signals.

The near-far problem does not arise between satellites in orbit because the relative distance from each satellite to an observer on earth is about the same, no matter where the observer moves on the surface of the earth. For example, the GPS constellation is in orbit approximately 26,600 Km above the earth's center of mass. If the satellites are in a 20,200 Km orbit above the surface of the earth (26,600 Km orbit above the center of the earth), then a satellite that is directly overhead is 20,200 Km away from an observer standing on the Earth's surface, which is as close as an in-orbit GPS satellite can be to an observer. A GPS satellite that is on the horizon, the greatest distance from which a signal from an in-orbit GPS satellite can be received on earth, will be approximately 25,800 Km away from the observer. Therefore, the distance between an observer and any two GPS satellites never varies by more than 28%, with the associated received signal levels differing by 2 dB or less.

This is not the case with pseudolites on earth. Consider two pseudolites, one 10 Km from the receiver and another 1 Km from the receiver. If both pseudolites are broadcasting at the same power level, there will be a 100-fold difference between the received power levels of the two pseudolites, since, assuming spherical signal spreading between the pseudolite and receiver, received power is inversely proportional to the square of the distance.

When a pseudolite broadcasts on the GPS frequency, the near-far problem can be mitigated if the pseudolite only broadcasts part of the time. If, for example, the pseudolite broadcasts for 100 msec and then is off for 900 msec, it will have a 10% duty cycle. That is, the pseudolite broadcast will only interfere with the GPS broadcast 10% of the time. A good GPS receiver will be able to maintain lock on the GPS constellation if the pseudolite duty cycle is short enough (typically 10% or less). The length of a pseudolite's duty cycle is constrained in two ways. First, it must be long enough to allow the receiver to receive and process the pseudolite data stream. Second, it must not be so long that it prevents the receiver from receiving and processing data streams from the GPS constellation or other pseudolites. From a practical standpoint, using the GPS frequencies for pseudolite broadcasts has two major shortcomings. One is the near-far problem and the associated interference with the GPS transmissions. The second is the fact that the GPS spectrum is protected.

The near-far problem between a pseudolite and the GPS constellation can be eliminated if the pseudolite broadcasts on a different frequency than the GPS constellation. However, when multiple pseudolites broadcast on the same frequency (GPS frequency or otherwise), the near-far problem will exist between pseudolites. This near-far interference can be eliminated through the use of Time Division Multiple Access (TDMA) transmissions. In a TDMA system, each source transmits during a different time interval. The present invention interleaves multiple pseudolite broadcasts using time division multiplexing. In this way, no two satellites that are in proximity to one another broadcast at the same time. Multiple pseudolites can use the same broadcast time-slot when the geographic distance between pseudolites is great enough and pseudolite power levels are low enough to prevent one pseudolite from interfering with another.

When time division is used to multiplex pseudolite transmissions at an off-GPS frequency, pseudolites can be used to augment the GPS constellation without interfering with the GPS constellation or interfering with one another. In addition, a network of pseudolites can be established to work independently of GPS. For example, pseudolites can be placed at selected wireless telephone base-stations, with pseudolite transmissions first time-synchronized, then interleaved using TDMA. A GPS-like receiver in the wireless handset could then use pseudolite broadcasts to calculate the location of the wireless handset in the same way that a GPS receiver uses GPS satellite broadcasts to calculate the GPS receiver's location.

Pseudolites have been employed as a means of improving the reliability of GPS location capabilities in various vehicle location systems. In U.S. Pat. No. 5,311,194 to Brown, a pseudolite is employed to transmit differential corrections to GPS satellite code and carrier measurements to a broadband GPS receiver on board an aircraft, and to provide additional code and carrier measurements to assist in a navigation solution in an approach and landing system for aircraft. Brown discloses the use of a single pseudolite broadcasting at a frequency offset from the L1 GPS frequency in order to prevent interference with the satellite navigation system. However, Brown does not recommend the use of time-slotted transmission because such a signal format does not allow contiguous carrier phase measurements of the pseudolite signal and affects the use of the signal as a communication link.

U.S. Pat. No. 5,646,630 to Sheynblat describes a system for differential navigation of an autonomous vehicle, employing a plurality of satellites, a plurality of ground transmitters, and a base station. The ground transmitters disclosed by Sheynblat do not suffer the near-far problem because they do not have receiving antennas or satellite tracking capabilities. The autonomous vehicle does receive ground transmitter signals, and although Sheynblat discloses TMDA communication links, TDMA broadcasts are not used to mitigate any near-far problem experienced by the autonomous vehicle.

U.S. Pat. No. 5,301,188 to Kotzin describes the use of TDMA timeslots to solve the near-far problem in a TDMA cellular network, where a relatively distant telephone subscriber might experience interference from the tail of one time frame boundary overlapping the beginning of another time frame boundary. Kotzin proposes to reduce this problem by allocating time slots nearest a frame boundary to subscribers nearer the site. Kotzin does not address TDMA transmissions in a GPS environment, the invention instead being directed toward a mechanism for shared-carrier frequency-hopping.

The present invention is a method and apparatus comprising at least three binary code signal sources, with at least one signal source being a pseudolite which transmits binary code signals on at least one radio frequency not used by the Global Positioning System. Each pseudolite transmits signals according to a time division multiplexing system. The invention further comprises at least one mobile receiver, typically a wireless telephone, which receives binary code signals. Each mobile receiver is associated with a signal time processor and a location processor. Each signal time processor determines binary code signal arrival times at an associated mobile receiver, and each location processor determines the location of an associated mobile receiver from binary code signal arrival times and binary code signal source location information.

The present invention comprises a method and apparatus for augmenting the GPS with ground-based satellites, or pseudolites, for the principal purpose of locating wireless telephones, using time division multiplexing, or Time Division Multiple Access (TDMA), to interleave coded spread spectrum or pseudo-random code sequence pseudolite transmissions. When pseudolites broadcast concurrently on the same frequency or in the same frequency band, signals from pseudolites near a receiver can block reception of signals from pseudolites farther from the receiver. The present invention avoids this near-far problem by employing time division multiplexing so that, within a given geographic area, no two pseudolites broadcast at the same time on the same frequency. Additionally, a pseudolite broadcasting on a GPS frequency can block GPS signals. GPS signal blocking is avoided by confining pseudolite broadcasts to non-GPS frequencies. The present invention also comprises a network of pseudolites broadcasting TDMA-synchronized signals and operating independently from the GPS constellation.

A first object of the present invention is to allow multiple pseudolite transmissions to occur without interference. Standard GPS applications rely entirely on continuous CDMA transmissions to broadcast all codes simultaneously. The present invention interleaves pseudolite broadcasts with a TDMA transmission scheme to prevent the near-far problem that can occur when a receiver is closer to one pseudolite than it is to another pseudolite.

A second object of the present invention is to expand the area in which a mobile receiver can receive geolocation signals. The GPS signal is often blocked or masked by foliage, buildings, geographic features, and other structures. In the present invention, a network of time-synchronized pseudolites in selected geographic locations augments the GPS or operates independently of the GPS, expanding geolocation signal coverage and improving accuracy. Time division multiplexing allows pseudolites that are in geographic proximity to one another to broadcast at the same time, and also allows increases in pseudolite transmission power levels without creating signal conflicts. Higher transmission power levels improve signal reception within and behind interfering structures. In addition to locating wireless telephones, this invention is also applicable to location of other objects, in conjunction with or independent of GPS, such as cars and trucks, railroad cars, or any other object. Expanded effective location area and improved accuracy support the FCC's E-911 initiative, improving system capability for locating mobile phones making 911 emergency calls, and also support other value-added services such as location-based billing, fleet management, and Intelligent Transport System (ITS) applications.

A third object of this invention is to allow placement of pseudolites at existing wireless base-stations, independent locations, or a combination of independent and base-station sites. Pseudolites can often use existing wireless broadcast facilities, or can be sited independently. Higher pseudolite transmission power levels extend signal range, allowing the use of fewer pseudolites to cover a geographic area.

An fourth object of this invention is to use frequency spectrum currently allocated for wireless communications for pseudolite broadcasts. The pseudolite broadcasts if this invention either use dedicated spectrum or share the spectrum with other applications by spreading the pseudolite transmission across the frequency band, avoiding interference with GPS signals while efficiently utilizing bandwidth resources.

These and other objects are accomplished in accordance with the preferred embodiment of the present invention, in which a network of pseudolites broadcasts CDMA signals interleaved by a TDMA system on a non-GPS radio frequency. Pseudolites may be located at existing wireless sites or at independent locations. The pseudolites may synchronize signal transmissions with the GPS system. Adjacent pseudolites broadcast at different times so as to eliminate near-far signal interference between pseudolites. A mobile receiver, typically a cellular telephone, receives pseudolite transmissions, and may also receive GPS transmissions. A time of arrival processor, which may be embedded in the mobile receiver or located elsewhere, determines the distance of each transmission source from the mobile receiver. A location processor, which likewise may be embedded in the mobile receiver or located elsewhere, combines source distance measurements with source location information to find the location of the mobile receiver. The location processor may access source location information in a database within the mobile receiver, or location information may be encoded in transmissions. Once the mobile receiver location is determined, the location may be reported to a remote location.

DETAILED DESCRIPTION OF THE INVENTION

The preferred embodiment of the present invention is a system for locating a wireless telephone comprising a ground-based network of pseudolites, each of known location, that use TDMA to broadcast time-synchronized, interleaved, coded spread spectrum signals that can be used to determine the distance between a transmitter and a wireless telephone with an embedded receiver capable of receiving and processing the pseudolite transmissions or capable of receiving and processing both GPS satellite and pseudolite transmissions. For purposes of this invention, GPS satellite transmissions shall include transmissions from GLONASS and other satellite positioning systems. The network broadcasts pseudo-random code sequences on a prescribed frequency, as known in the art. The network of pseudolites is time-synchronized, and the code sequences are selected to have poor cross-correlation properties, as are GPS code sequences. The code sequences are then broadcast. The pseudolite broadcasts are sequenced using time-division multiplexing so that each pseudolite broadcasts in an assigned time-slot, at predetermined time intervals, and only one pseudolite broadcasts in each time-slot in any given local geographic area. Time-slots can be reused when there is sufficient geographic separation between pseudolites to prevent RF interference.

Although the description of the present invention is directed primarily toward the location of wireless telephones, the present invention is not limited to location of wireless telephones, but may in addition be applied to the process of locating any object with an embedded pseudolite and or GPS/pseudolite receiver that processes the coded spread spectrum ranging-signals broadcast from a network of pseudolites.

Stand-alone Pseudolite Network

Figure 1:
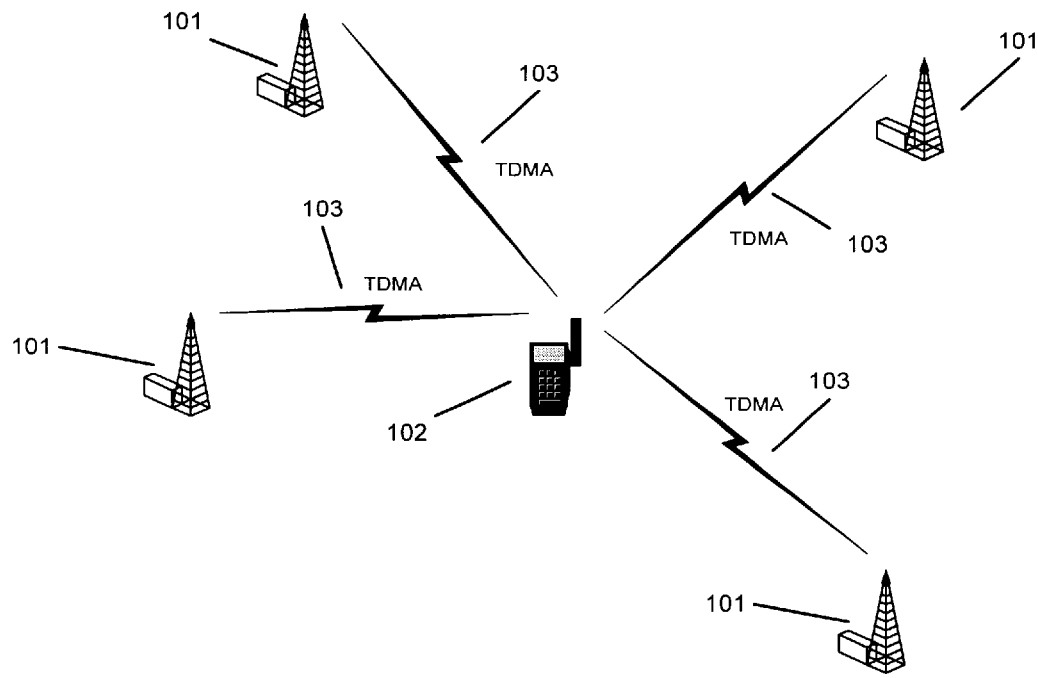
FIG. 1 illustrates the location process using a time-synchronized network of ground-based pseudolites.

FIG. 1 depicts a network of pseudolites (101). The pseudolites are time-synchronized so that their transmissions can be time-division multiplexed and can occur at predetermined times. The network can be time-synchronized by several methods. These methods include the use of a GPS receiver or an atomic clock at each pseudolite installation, or the implementation of a network synchronization scheme. Time-synchronization is critical because GPS and the equivalent network of pseudolites covered by this invention use Time-of-Arrival processing to determine location, and time-synchronization affects the accuracy of the location solution.

However, not all applications require the same accuracy standards. The ability to locate a cross-country moving van to within a few kilometers may be sufficient for certain purposes, whereas determining where to send emergency assistance in a metropolitan area may require the ability to locate the person needing assistance to within 30 meters. If the pseudolite network is used to control the spacing of cars on a freeway, location accuracy requirements may be as small as 0.1 meters. The accuracy requirements attendant to the application will determine the needed accuracy and, therefore, what time standard is acceptable.

In FIG. 1, each pseudolite (101) broadcasts a distinguishable code sequence (pseudo-random noise) during a specified time-slot. A pseudolite receiver (102) includes, or has access to, a database containing each pseudolite's code sequence and the time-slot during which each pseudolite's sequence is broadcast. The pseudolite receiver (102) uses a replica of each code sequence and matched replica processing to determine if a code sequence is being received and when the sequence arrived. Matched replica processing is the process by which a replica of a code sequence is compared (or correlated) with the received signal. Because the different code sequences are designed to have poor cross-correlation with any codes except the self code, the replica will correlate with the received signal only if the received signal contains the sequence of codes that match the replica and only when the replica is correctly aligned with the code sequence. When correctly aligned, the first bit in the received sequence will line up with the first bit in the replica, the second bit in the received sequence will line up with the second bit in the replica, etc. Matched replica processing is further explained in U.S. Ser. No. 08/855,589 which is assigned to the assignee of this application and incorporated herein by reference.

Once the pseudolite receiver (102) matches its replica with the transmitted bit stream from any particular pseudolite, the pseudolite receiver (102) can then determine when the bit stream was received. The pseudolite receiver (102) can also determine when the bit stream was broadcast from preloaded or transmitted data, allowing the pseudolite receiver (102) to determine the elapsed time between broadcast and reception of the bit stream. Given the elapsed time and the speed of transmission, which is the speed of light, the distance between the pseudolite receiver (102) and the pseudolite can be determined. This distance describes a sphere about the pseudolite, with the intersection of the sphere and the Earth's surface describing a radius at which the receiver must be located. If signals are received and detected from three or more pseudolites (101), the location of the pseudolite receiver (102) and a clock correction can be determined. Three signals are needed to determine north, east, and time; four are needed to determine north, east, up, and time. The clock correction is used to synchronize the pseudolite receiver's clock with the pseudolite network clock, since the clocks must be synchronized to accurately determine the elapsed time between code sequence transmission and reception.

Since pseudolite signal processing functions such as signal reception, demodulation, or the code correlation process are, with a few exceptions, identical to analogous GPS signal processing, no detailed description is provided herein. The exceptions include frequency corrections to accommodate the Doppler and relativistic effects resulting from satellite movement. Apart from having fixed locations on Earth's surface, pseudolites are functionally equivalent to GPS satellites, so location determination methods using pseudolites signals are identical to those used for GPS satellite signals. Measurements from pseudolites can be combined directly with measurements from GPS satellites to determine receiver location. Similarly, both the GPS and the pseudolite system of the present invention use Time-Of-Arrival processing to determine location. Since the process for determining the range between the pseudolites and a receiver is also identical to the processing used for GPS signals, with a few minor exceptions, no separate description of this process is provided. Because the pseudolite propagation ranges are so much shorter than those of GPS satellites, typically less than 100 Km rather than in excess of 20,000 Km, corrections are not needed in the pseudolite solution for ionospheric and tropospheric transmission delays. Pseudolite signal processing is similar to that used by GPS receivers and is therefore well-known in the art. Pseudolite and GPS signal processing methods are not a subject of the present invention.

Pseudolite Network Augmenting the GPS

Figure 3:
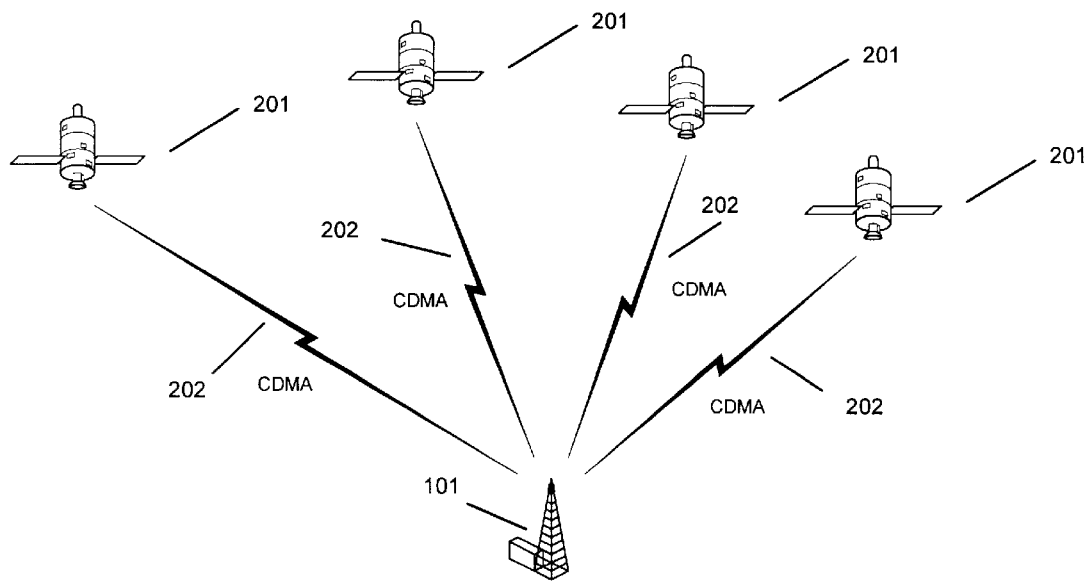
FIG. 3 illustrates a GPS satellite constellation providing time synchronization for the pseudolite network.

FIG. 3 shows the GPS constellation providing timing synchronization for a pseudolite network. That is, each pseudolite (101) incorporates a GPS receiver that receives CDMA signals (202) from the satellites (201). With CDMA broadcasts, all satellites broadcast continuously on the same frequency. The code sequences broadcast are extracted from each other using matched replica correlation. Matched replica correlation is also used to extract the code sequences from the pseudolite broadcasts, but each pseudolite broadcasts in a different time slot using time domain multiplexing to avoid near-far reception conflicts. Since each pseudolite's location is known, errors in the GPS solution (north, east, up, and time) for each pseudolite's location will predominately result from pseudolite clock errors. The GPS system will allow these errors to be determined and will also time-synchronize the pseudolite network with the GPS satellite network. Synchronization of the pseudolite network with the GPS satellite network allows the ranges from both networks (satellite to receiver and pseudolite to receiver ranges) to be directly combined.

Figure 2:
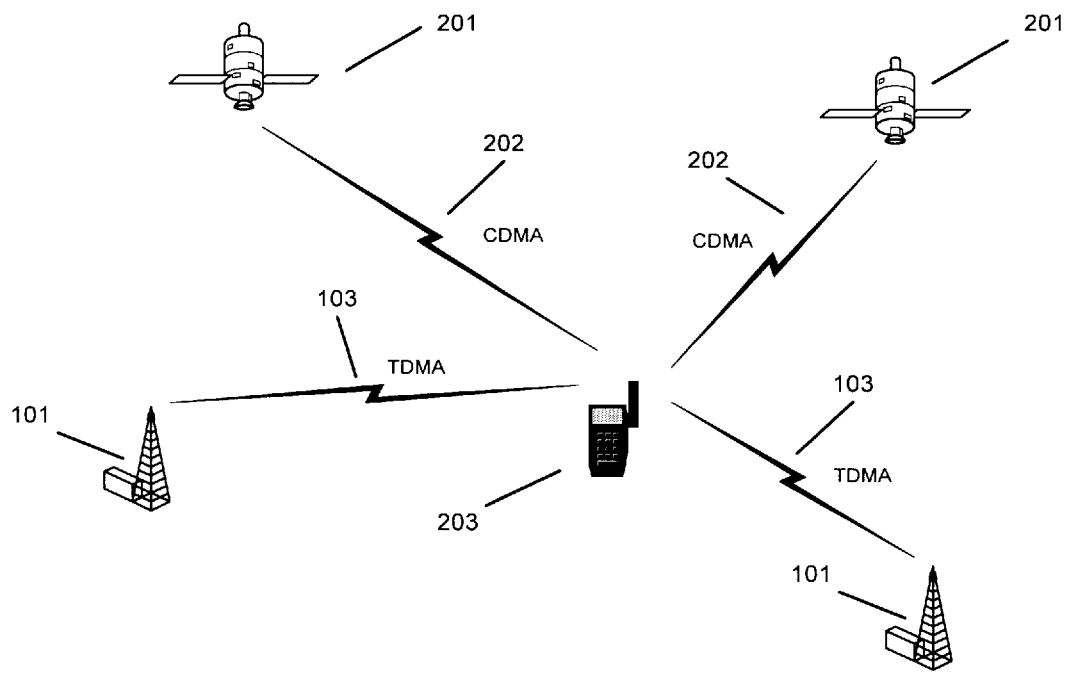
FIG. 2 illustrates the location process using the GPS in conjunction with a time-synchronized network of ground-based pseudolites.

FIG. 2 is similar to FIG. 1, except that it depicts a network of pseudolites (101) being used in conjunction with the GPS constellation (201). When the pseudolite network is used in conjunction with the GPS, the pseudolite receiver must be modified to process both GPS and pseudolite signals, resulting in a pseudolite/GPS receiver (203). In addition to using the GPS as a time standard and synchronization mechanism for the pseudolite network, the pseudolite/GPS receiver (203) shown in FIG. 2 uses TOA measurements from both the GPS satellites and the ground-based pseudolites for determining its location. In this way the pseudolite network augments the GPS. When GPS signals are blocked by buildings or other obstructions, the pseudolites provide additional ranging information that can be used in the location calculations. This is particularly important when a GPS solution can not be obtained because fewer than four satellites are in view. In addition, because the transmission path of the pseudolites is typically 100 Km or less and the transmission path of the GPS satellites is about 20,000 Km, pseudolite signal attenuation is much lower. In addition, because the pseudolites are not constrained by limited access to power, they can broadcast at much higher power levels than the GPS satellites. These two factors allow pseudolite signal reception in areas where signal attenuation can prevent GPS signal reception.

Since the principals of operation are identical for the GPS and pseudolite networks, the only substantial changes made in a pseudolite receiver to enable it to process GPS signals occur in the RF part of the pseudolite receiver. That is, the bandwidth of the resulting pseudolite/GPS receiver must accommodate and process both the GPS and the pseudolite frequency bands. This may involve one wide RF band or two separate bands, one for the GPS transmissions and one for the pseudolite transmissions. Once the RF bands are shifted to a common intermediate frequency, GPS and pseudolite signal processing are similar. The demodulation and correlation processes are the same. The only other substantial difference is the processing of the information that is modulated onto the pseudo-random noise bit stream. The GPS bit stream carries information such as satellite almanacs, and ephemeris and clock corrections. The pseudolite bit stream would not include this information since the pseudolites are at known, fixed locations. However, other information could be modulated onto the bit stream, such as the pseudolite's geographic identity or coordinates and the time-slot during which it is broadcasting. The demodulation process for obtaining this information from the pseudolite bit stream would be the same as that employed for GPS. However, the information may be applied differently.

It should be noted that processing of the pseudolite pseudo-random noise bit streams will generally be easier to do than processing the GPS satellite pseudo-random noise bit streams. The received pseudolite power levels will be higher than the received GPS power levels, resulting in better signal-to-noise ratios, which will in turn make it easier to conduct the matched replica correlation process. Second, the pseudolite pseudo-random noise bit streams can be much shorter than the GPS pseudo-random noise bit streams, simplifying the matched replica correlation process. In fact, GPS uses very long bit streams for the precise positioning service to make it hard for unauthorized users to use the system. The elapsed time between when a bit stream is transmitted by a pseudolite and received by the receiver is much shorter than the elapsed time between when a bit stream is transmitted by a GPS satellite and received by the receiver. A bit stream must be long enough to prevent ambiguity as to when it was transmitted. The shorter the distance (and therefore elapsed transmission time) between transmitter and receiver, the shorter the pseudo-random bit streams need to be.

Figure 4:
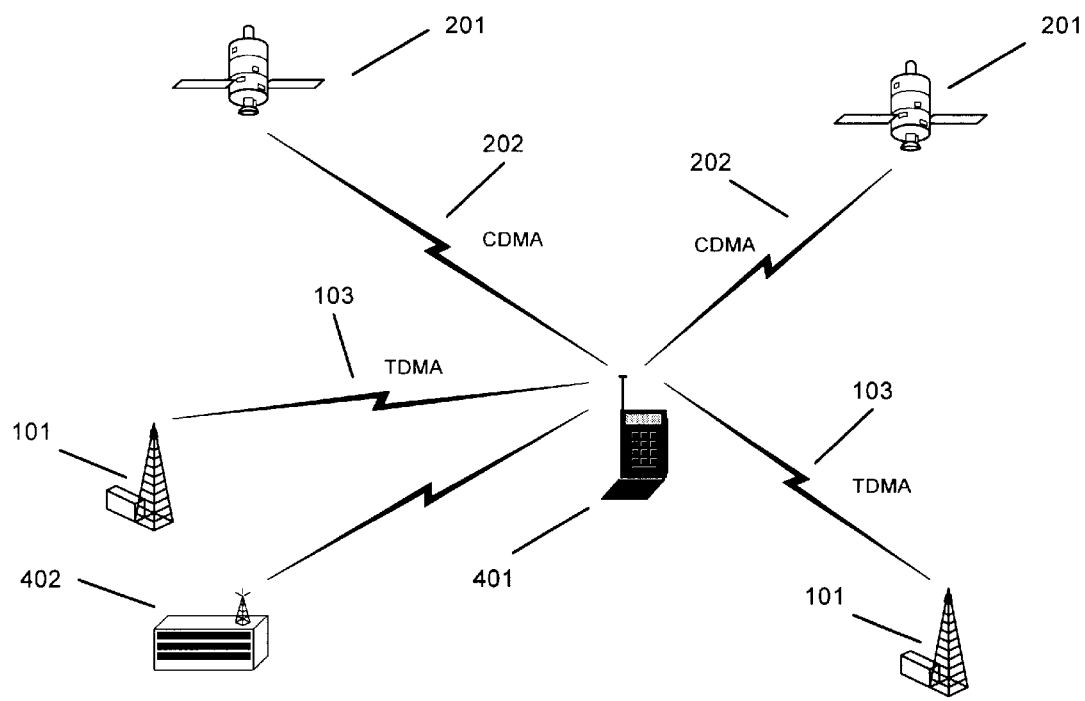
FIG. 4 illustrates the process of locating a mobile telephone using the GPS in conjunction with a time-synchronized network of groundbased pseudolites.

Pseudolite Network Augmenting the GPS in Conjunction with a Mobile Telephone FIG. 4 depicts the incorporation of a pseudolite and GPS receiver into a mobile or wireless telephone (401). Examples of mobile telephones include cellular systems, the Personnel Communication System (PCS), and Specialized Mobile Radio (SMR). System operation is identical to that as described for FIG. 2. The GPS/pseudolite receiver is incorporated into a mobile telephone to provide a mechanism for transmitting location information to remote locations. It is not essential to have a GPS receiver embedded in the mobile telephone, so long as the pseudolite coverage is adequate for the given geographic area. The pseudolite system can be used autonomously or in conjunction with the GPS system. Likewise, the GPS system can operate autonomously or in conjunction with the pseudolite system.

As noted above, adding a pseudolite receiver or GPS/pseudolite receiver to a mobile telephone allows the location of the mobile telephone (401) to be transmitted to a remote location (402). This capability enables the pseudolite solution to be used for such applications as providing the location of a person placing a 911 call to a public safety answering point to facilitate emergency response. It also allows the implementation of location-based billing in which the cost of the call is a function of the location of the caller, fleet dispatching and monitoring, traffic monitoring, roadside assistance, and other applications where a mobile telephone can be used to relay location information.

When the pseudolite receiver is combined with a mobile telephone, the pseudolites can be located at mobile telephone base-stations. Since the base-stations are normally sited so that they have an unobstructed view of the horizon, they provide excellent sites for installing GPS receivers. In addition, the base-stations may already have transmission facilities that can be used to broadcast the pseudolite transmissions. The base-stations also provide a geographic network that will provide pseudolite coverage anywhere there is also a wireless transmission capability for transmitting the location of the mobile telephone. If pseudolite transmissions are of sufficient power, it may not be necessary to populate each base-station with a pseudolite. Pseudolite transmissions can be designed not to interfere with one another through geographic separation and TDMA interleaving. Therefore, pseudolite power levels can be relatively high compared to GPS signal levels, making it possible to cover a large geographic area with relatively few pseudolites as compared to the number of wireless base-station sites normally needed to provide voice transmission coverage in an equivalent area. The number of wireless base-station sites is often driven by the need to provide sufficient bandwidth to handle the existing wireless communications. As the number of callers in a given geographic area increases, resulting in increased call density, cell sizes decrease and spacing between base-stations is reduced. Since pseudolite transmissions all occur on a single channel and are independent of the number of users, each pseudolite can potentially cover a much larger geographic area than a corresponding wireless communication base-station.

Combining a GPS and pseudolite receiver has another potential advantage. In order for a GPS receiver to rapidly acquire the GPS satellites, it first needs to know its own approximate position (within about 100 miles). If it does not know its own approximate location, it does not know which satellites should be in view. This can happen anytime a GPS receiver is transported while turned off. When this occurs, the satellite acquisition process will typically take three to five minutes, depending on the receiver configuration, compared to about thirty seconds when the receiver has a good approximate position. If the pseudolite receiver knows where the pseudolites are located in the local area, then the GPS receiver can use the location of a nearby pseudolite as its approximate location. Being able to acquire a rapid first fix is critical to some location applications, particularly when the GPS receiver is used in conjunction with a mobile telephone to report 911 emergencies.

TDMA Time-Slot Allocation

Figure 5:
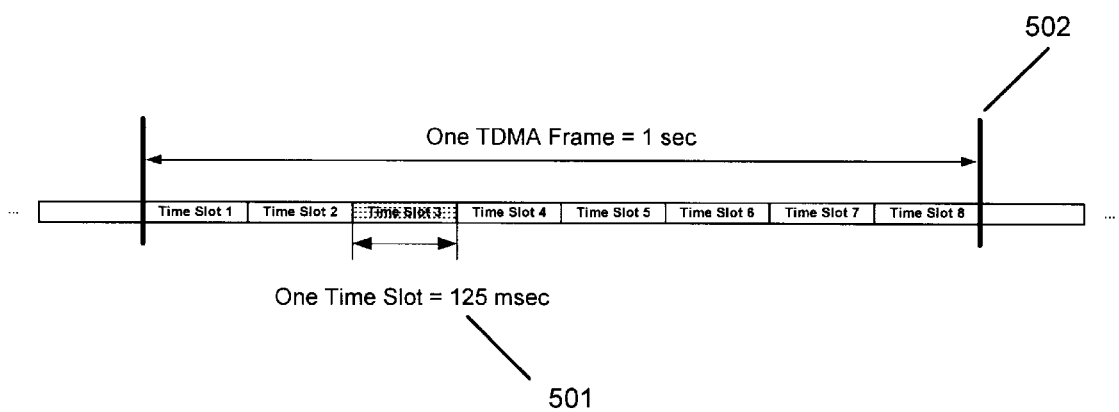
FIG. 5 illustrates a TDMA timeslot allocation.

TDMA is a process by which multiple transmitters broadcast on the same frequency, but each transmitter is assigned a different time-slot during which it, and only it, transmits. Each pseudolite is assigned a TDMA time-slot within which it transmits spread spectrum code sequences in the local reception area. TDMA time-slots may be allocated in any manner consistent with such factors as the operational requirements of the given application, the receiver's characteristics, and the characteristics of the code sequence. For example, FIG. 5 illustrates the case where the time-slots (501) can be 125 milliseconds each, which would result in 8 time-slots per one-second TDMA frame (502) and a 12.5% duty cycle. 125 millisecond slots repeated every two seconds might also be acceptable, resulting in 16 different time-slots and a 6.25% duty cycle. Likewise, the time-slots could be 3 milliseconds in duration and repeat every 60 milliseconds with a resultant 5% duty cycle. If the receiver needs a relatively long time period to capture the code sequence, then longer time-slots are needed, but not necessarily a higher duty cycle. If the application needs rapidly updated positions, then short time-slots that repeat frequently may be preferred. If the code sequence is long or fluctuates slowly, then a longer data series may be needed to effect the correlation process. There can be significant flexibility in designing the TDMA sequencing scheme.

Location Determination

GPS uses time-of-arrival (TOA) procedures to determine the receiver's location. Given the location of a satellite, the time that the satellite's coded message was transmitted, and the time the coded message was received at the receiver, the distance from the satellite to the receiver can be determined. Since all satellites broadcast on the same frequency, each satellite broadcasts a different code. All of the satellites are time-synchronized and broadcast their code sequence at the same time. The code sequence is finite in duration and is broadcast repeatedly. The receiver knows each satellite's code sequence and is able to determine when it receives the sequence using matched replica correlation. Since the satellites are in known orbits, orbit information and ephemeris contained in the satellite almanac and satellite orbit corrections are modulated onto the satellite's code sequence, the receiver can continuously determine each satellite's location. Given the satellite's location, when the code sequence was broadcast, the nominal time of code sequence reception, and the speed of transmission, which is the speed of light, the receiver can determine how far away it is from the satellite. Using ranges from multiple satellites, the location of the receiver and the receiver's clock error can be determined geometrically. The receiver's clock error must be determined because it is necessary to ensure that the receiver's clock is synchronized with the satellite constellation's clock in order to make accurate satellite-to-receiver range estimates since the whole process centers on the ability to measure the elapsed time from when the coded sequence was broadcast until it was received. GPS processing is well-known in the art and not a subject of the present invention.

Processing of pseudolites signals is similar to processing satellites signals. The pseudolites broadcast coded sequences at pre-determined time intervals. A receiver processes these sequences in the same manner that it would process a satellite code sequence. By processing the sequence of codes, the receiver can determine the nominal time at which the code sequence was broadcast and the time it was received. If the receiver knows the geographic location of the pseudolite, it can then determine its range from the pseudolite, just as it determined its range from the GPS satellites. From the receiver's viewpoint, the pseudolite is simply a satellite that is located on the ground rather than in space. Mathematically, the processing is the same. As a result, a receiver can determine its location by processing the signals received from GPS satellites, pseudolites, or a combination of signals from satellites and pseudolites. In this way, pseudolites can be used to augment the GPS constellation.

Pseudolite Broadcasts

Each pseudolite transmits a sequence of codes. More than one pseudolite can transmit the same code sequence, but simultaneous transmission can occur only when there is sufficient geographic separation between each pseudolite and the receiver that the sequences do not interfere with one another. That is, during any given time-slot, the receiver only receives any particular code sequence from one pseudolite. The received power from other pseudolites broadcasting the same codes during the same time-slot is so low as to be unobservable. The system differs from a standard GPS system in that the codes are not broadcast continuously. Instead, a TDMA system is used to interleave the spread spectrum code transmissions.

For the sake of illustration, assume a 12.5% duty cycle is used in conjunction with 8 pseudolites to cover a particular geographic area. There would then be eight different time-slots during which transmissions could be made. Each pseudolite in the network would have a time-slot for broadcasting its code. Each signal is received distinctly and unambiguously by the mobile receiver since only one pseudolite, within local range of the receiver, is transmitting during each time-slot. Because it is an unambiguous transmission, there is no near-far problem. That is, one signal does not overpower another since, within a given geographic area, only one code sequence is being broadcast at a time.

Pseudolite Locations

Once a mobile receiver receives transmissions from the requisite number of satellites and/or pseudolites, it must determine the locations of those sources in order to determine its own location. The requisite number of satellites is normally four when north, east, up, and time are being calculated and three when north, east, and time are being calculated. For any particular time, the location of each GPS satellite is contained in published and broadcast almanacs and is updated with ephemeris corrections that are modulated onto the satellite's code sequence. In the case of pseudolites, there are multiple methods by which a mobile receiver can determine a pseudolite's location. In any particular situation, the application and any hardware constraints will influence which implementation method is used. For example, if a mobile receiver knows where each pseudolite is located, what code sequence each pseudolite is transmitting, when the code sequences are transmitted, and when the code sequences were nominally received, then the mobile receiver can determine its own location using standard GPS time-of-arrival geometric techniques, as are well-known in the art.

The time at which the code was received can be determined by correlating a replica of the code with the received code. The time of arrival of the received sequence can be determined in the mobile receiver or in an associated processor to which received signal representing time is communicated. The time at which the code was transmitted is determined by which time-slot was assigned to that particular pseudolite. Pseudolite broadcast times can be preloaded into the receiver's database, modulated onto the pseudolite's data stream, modulated onto a separate administrative data stream, provided over a different frequency, broadcast over a mobile telephone network, or made available to the receiver by some other means.

The location of each pseudolite can be contained in a database in a location processor associated with the mobile receiver. To apply this database, the location processor would have to know its approximate position in order to determine which pseudolites it was receiving (assuming each code is used by more than one pseudolite) or use an iterative search process.

Another method for providing the location of a pseudolite to the receiver is to have each pseudolite send its location to the receiver or send a unique identification number that the receiver could use as an index to lookup the stored location of the pseudolite in a database. For example, if pseudolites are located at mobile radio base-stations, this can be done at call set-up using the wireless communication network, or whenever the wireless phone registers with a cell site. A separate frequency can be set aside for the purpose of sending all administrative information to the receiver, such as the location of all pseudolites in an area, which code sequence each pseudolite is broadcasting, time synchronization information, pseudolite identification numbers. Still another method would be to encode the pseudolite's location on its pseudo-random noise bit stream. Another method would be to encode a code on the pseudolite's pseudo-random noise bit stream that could be used by the receiver to look up the pseudolite's location, code sequence, or transmission time-slot in pre-stored database. Yet another method is to have one code sequence used strictly for providing administrative information such as which pseudolites are in the area, where they are located, what code sequence each is broadcasting, and in which time-slot the broadcast is being made.

Alternatively, each pseudolite site can be numbered, with the number representing the code a specific pseudolite is using. For example, the last two digits of the number can tell the mobile receiver which code to use. If a pseudolite is located at, or geographically related to, a wireless base-station, the pseudolite's identification number could be sent when a mobile receiver initiates a call or registers with the base-station. And, as with pseudolite location, a separate frequency can be set aside for the purpose of sending all administrative information to the mobile receiver or a dedicated code sequence can be used to provide administrative information.

A pseudolite's code sequence can be sent to the mobile receiver in much the same way as the pseudolite's location. However, there can be some differences. For a wide-based implementation where there are many, possibly hundreds, of pseudolites, it may be necessary to use only a few (e.g., twelve) different codes. It is not computationally difficult for a mobile receiver to determine which codes it is receiving when the number of code sequences is relatively small. However, the length of the code sequence, the data rate, and the orthogonality of the codes could all affect the time it takes the receiver to perform the code correlation process.

If the distance between the pseudolite and the mobile receiver is great enough that a second code sequence is transmitted before the first one reaches the receiver, then ambiguous solutions for any single pseudolite can result. This ambiguity can be avoided by using code sequences that are long enough to prevent this situation from occurring, by requiring the mobile receiver to be less than one code length away from the pseudolite, by reducing pseudolite power to reduce the distance at which a transmission can be received, or by resolving the ambiguity geometrically by determining which location correlates with the receiver's distance from all of the received pseudolites. These procedures are similar to the procedures that are used in GPS. It should be noted however that the distances between the pseudolites and the receiver are so short compared to GPS that none of the points discussed in this paragraph should be factors that even need to be considered when implementing a pseudolite system under normal operating conditions.

Pseudolite Frequencies

Almost any frequency can be used for the pseudolite broadcasts. The only constraint is that there be sufficient bandwidth for the spread spectrum code sequence. The amount of bandwidth needed is associated with the code chipping rate, which is the rate at which the numbers in the code change. For GPS, the coarse acquisition chipping rate is approximately 1 MHz and the precise position service chipping rate is approximately 10 MHz. The bandwidth needed to support these chipping rates is 1 MHz and 10 MHz respectively. Slower chipping rates require a correspondingly smaller bandwidth, but the resolution or accuracy of the solution is inversely proportional to the chipping rate. When used in conjunction with wireless communications, the ability to use previously allocated communication frequencies for the pseudolite transmissions avoids major changes to the mobile receiver's RF front end, since the frequency bands of the communications receiver and pseudolite receiver will be similar. Examples include frequency allocations for cellular communications, Specialized Mobile Radio (SMR) and Enhanced Specialized Mobile Radio (ESMR), the Location and Monitoring Service (LMS), the Personal Communications System (PCS), and the Narrow Band Personal Communication System (NPCS). The pseudolite transmissions could also be spread across multiple bands and broadcast in the background. For example, the cellular band is made up of many narrow band (typically 25 KHz) channels. The pseudolite signals could be spread across multiple channels, but cause negligible interference if the pseudolite broadcasts were conducted at relatively low power levels, which is often the case for spread spectrum transmissions. Broad-band spread spectrum overlay systems are known for use with wireless communications systems. These systems are typically dedicated to communications purposes, but can be used for location purposes as proposed herein.

The principles, preferred embodiments and modes of operation of the present invention have been set forth in the foregoing specification, from which it should now be readily apparent that a person of ordinary skill in the art may make and use the present invention. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

What is claimed is:

1. A geolocation system for augmenting the Global Positioning System with a network of pseudolites, comprising:

at least three binary code signal sources, wherein at least one of said binary code signal sources is a pseudolite capable of transmitting binary code signals on at least one radio frequency not used by the Global Positioning System, said pseudolite transmitting binary code signals according to a time division multiplexing system;

at least one mobile receiver capable of receiving binary code signals;

means for interleaving the binary code signals of said binary code signal sources, wherein a (different binary code signal) broadcast slot is assigned to each of said binary code signal sources;

a signal time processor associated with each mobile receiver, each said signal time processor being capable of determining the arrival times of binary code signals at an associated mobile receiver; and a location processor associated with each mobile receiver, each said location processor being capable of determining the location of an associated mobile receiver from binary code signal arrival times and binary code signal source location information.

2. A geolocation system as claimed in claim 1, wherein the signal time processor and the location processor are integrated.

3. A geolocation system as claimed in claim 1, wherein the signal time processor is embedded in the mobile receiver.

4. A geolocation system as claimed in claim 1, wherein the location processor is embedded in the mobile receiver.

5. A geolocation system as claimed in claim 1, wherein at least a second of the at least three binary code signal sources is a satellite of the Global Positioning System.

6. A geolocation system as claimed in claim 1, wherein at least one pseudolite is chronologically synchronized with a satellite of the Global Positioning System.

7. A geolocation system as claimed in claim 1, wherein each of the binary code signal sources is a pseudolite.

8. A geolocation system as claimed in claim 1, wherein the binary code signal sources comprise at least one pseudolite and at least one satellite of the Global Positioning System.

9. A geolocation system as claimed in claim 1, wherein the location processor further comprises a database containing pseudolite locations.

10. A geolocation system as claimed in claim 1, wherein the binary code signals include location information.

11. A geolocation system as claimed in claim 10, wherein the location information includes the location of the pseudolite.

12. A geolocation system as claimed in claim 10, wherein the location information includes an identification number for the pseudolite.

13. A geolocation system as claimed in claim 10, wherein the location information includes at least one pseudolite identification number, and the location processor includes an index to a database having an index of the pseudolite accessible by the location processor.

14. A geolocation system as claimed in claim 1, wherein the pseudolite reduces binary code signal attenuation by transmitting the binary code signals at higher power levels than binary code signals transmitted by satellites of the Global Positioning System.

15. A geolocation system as claimed in claim 1, wherein the pseudolite simultaneously transmits more than one binary code transmission sequence on a single frequency.

16. A geolocation system as claimed in claim 1, wherein the pseudolite transmits pseudo-random noise on a first frequency and location information on a second frequency.

17. A geolocation system as claimed in claim 1, wherein the pseudolite encodes and transmits location information in a bit stream comprising pseudo-random noise.

18. A geolocation system as claimed in claim 1, wherein the pseudolite transmits pseudo-random noise in a first binary code sequence and location information in a second binary code sequence.

19. A geolocation system as claimed in claim 10, wherein the location information comprises latitude and longitude.

20. A geolocation system as claimed in claim 10, wherein the location information comprises a grid reference.

21. A geolocation system as claimed in claim 10, wherein the location information comprises latitude, longitude, and elevation.

22. A geolocation system as claimed in claim 10, further comprising a telephone device coupled with said mobile Global Positioning System receiver the telephone device transmitting the location information.

23. A geolocation system as claimed in claim 1, further comprising a mobile transmitter for transmitting the location of the mobile receiver to a remote location.

24. A method for locating a wireless telephone by augmenting the Global Positioning System with a network of pseudolites, comprising the steps of:

transmitting binary code signals from at least three binary code signal sources, at least one binary code signal being transmitted from a pseudolite on a radio frequency not used by the Global Positioning System, the pseudolite binary code signal transmitted according to a time division multiplexing system;

interleaving the binary code signals of said binary code signal sources according to said time division multiplexing system, wherein said time division multiplexing system assigns a different binary code signal broadcast time slot for each of said binary code signal sources;

receiving the binary code signals with a mobile receiver;

determining the times the binary code signal sources transmitted the binary code signals;

determining the times the mobile receiver received the binary code signals; and determining the location of the mobile receiver from each binary code signal time of transmission and time of arrival, and from binary code signal source location information.

25. A method for locating a wireless telephone as claimed in claim 24, comprising the additional step of chronologically synchronizing at least one pseudolite with a Global Positioning System satellite.

26. A method for locating a wireless telephone as claimed in claim 24, wherein at least one of the binary code signal sources is a Global Positioning System satellite.

27. A method for locating a wireless telephone as claimed in claim 24, wherein all of the binary code signal sources are pseudolites.

28. A method for locating a wireless telephone as claimed in claim 24, wherein the binary code signal sources comprise the at least one pseudolite and at least one satellite of the Global Positioning System.

29. A method for locating a wireless telephone as claimed in claim 24, comprising the additional step of transmitting binary code signals from the pseudolite at power levels higher than binary code signals transmitted by satellites of the Global Positioning System.

30. A method for locating a wireless telephone as claimed in claim 24, wherein the pseudolite simultaneously transmits more than one binary code sequence on a single frequency.

31. A method for locating a wireless telephone as claimed in claim 24, wherein the step of determining the location of the mobile receiver includes the step of accessing a database containing pseudolite location information.

32. A method for locating a wireless telephone as claimed in claim 24, wherein the binary code signals include location information.

33. A method for locating a wireless telephone as claimed in claim 32, wherein the step of determining the location of the mobile receiver includes the step of extracting the location information.

34. A method for locating a wireless telephone as claimed in claim 32, wherein the location information includes a location of the one pseudolite.

35. A method for locating a wireless telephone as claimed in claim 32, wherein the location information includes a pseudolite identification number correlating to an index in a database containing pseudolite locations.

36. A method for locating a wireless telephone as claimed in claim 32 wherein the location information includes at least one pseudolite identification number.

37. A method for locating a wireless telephone as claimed in claim 32, further comprising the pseudolite transmitting pseudo-random noise on a first frequency and the location information on a second frequency.

38. A method for locating a wireless telephone as claimed in claim 32, further comprising the pseudolite encoding and transmitting the location information in a bit stream comprising pseudo-random noise.

39. A method for locating a wireless telephone as claimed in claim 32, further comprising the pseudolite transmitting pseudo-random noise in a first binary code sequence and the location information in a second binary code sequence.

40. A method for locating a wireless telephone as claimed in claim 32, wherein the location information comprises latitude and longitude information.

41. A method for locating a wireless telephone as claimed in claim 32, wherein the location information comprises a grid reference information.

42. A method for locating a wireless telephone as claimed in claim 32, wherein the location information comprises latitude, longitude, and elevation information.

43. A method for locating a wireless telephone as claimed in claim 32, further comprising transmitting location information when a telephone device coupled with said mobile Global Positioning System receiver transmits a signal.

44. A method for locating a wireless telephone as claimed in claim 24, further comprising transmitting the location of the mobile Global Positioning System receiver from the mobile receiver.

45. A geolocation system, comprising:
means for transmitting binary code signals from sources having known locations, including at least one ground-based means for transmitting binary code signals on a radio frequency not used by the Global Positioning System, the ground-based means transmitting binary code signals according to a time division multiplexing system;
means for receiving the binary code signals;
means for determining the arrival times of binary code signals at each means for receiving binary code signals;
means for interleaving the binary code signals of the binary code signal sources according to said time division multiplexing system, wherein said time division multiplexing system assigns a different binary code signal broadcast time slot for each of the binary code signal sources; and
means for determining a location of a mobile receiver from the arrival times of the binary code signals and the known locations of the binary code signal sources.

46. A geolocation system as claimed in claim 45, wherein a means for transmitting binary code signals includes at least one pseudolite.

47. A geolocation system as claimed in claim 45, wherein a means for transmitting binary code signals includes at least one Global Positioning System satellite.

48. A geolocation system as claimed in claim 45, wherein the means for determining the times of binary code signal arrivals is integrated with the means for determining location a mobile receiver.

49. A geolocation system as claimed in claim 45, further comprising means for chronologically synchronizing binary code signal transmissions of ground-based means with binary code signal transmissions from a Global Positioning System satellite.

50. A geolocation system as claimed in claim 45, wherein the means for receiving the binary code signals comprises means for receiving only pseudolite signals.

51. A geolocation system as claimed in claim 50, wherein the means for receiving the binary code signals comprises means for receiving both pseudolite and Global Positioning System signals.

52. A geolocation system as claimed in claim 45, wherein the means for determining the times of binary code signal arrivals is embedded in the mobile receiver.

53. A geolocation system as claimed in claim 45, wherein the means for determining a location a mobile receiver is embedded in the mobile receiver.

54. A geolocation system as claimed in claim 45, wherein the binary code signals include said location information.

55. A geolocation system as claimed in claim 45, wherein the location determination means includes means for accessing a database containing location information on at least one of the ground-based means for transmitting binary codes.

56. A geolocation system as claimed in claim 54, wherein the location information includes a location of the ground-based means for transmitting binary codes.

57. A geolocation system as claimed in claim 54, wherein the location information comprises latitude and longitude information.

58. A geolocation system as claimed in claim 54, wherein the location information comprises latitude, longitude, and elevation information.

59. A geolocation system as claimed in claim 54, wherein the location information comprises a grid reference.

60. A geolocation system as claimed in claim 54, wherein the location information includes an identification number for the ground-based means for transmitting binary codes.

61. A geolocation system as claimed in claim 54, wherein the location information includes an identification number for the ground-based means for transmitting binary codes, the identification number correlating to an index to a database.

62. A geolocation system as claimed in claim 45, wherein a ground-based means for transmitting binary codes transmits pseudo-random noise on a first frequency and location information on a second frequency.

63. A geolocation system as claimed in claim 45, wherein a ground-based means for transmitting binary codes encodes and transmits location information in a bit stream comprising pseudo-random noise.

64. A geolocation system as claimed in claim 45, wherein a ground-based means for transmitting binary codes transmits pseudo-random noise in a first binary code sequence and location information in a second binary code sequence.

65. A geolocation system as claimed in claim 45, further comprising a telephone means for transmitting a signal, the telephone means transmitting the location information and being coupled with the means for receiving said binary code transmissions.

66. A geolocation system as claimed in claim 45, wherein said ground-based means for transmitting binary codes includes means for transmitting said binary codes at power levels higher than binary code transmissions from satelites of the Global Positioning System.

67. A geolocation system as claimed in claim 45, wherein said ground-based means for transmitting binary codes simultaneously transmits more than one binary code sequence on a single frequency.

68. A geolocation system as claimed in claim 45, wherein mobile receiver includes means for transmitting location of the mobile receiver to a remote location.

* * * * *